United States Patent Office 3,033,907
Patented May 8, 1962

---

3,033,907
SUBSTITUTION TYPE TiO₂ SEMI-CONDUCTORS
Charles V. Rue, Tiffin, Ohio, assignor to Erie Resistor Corporation, Erie, Pa., a corporation of Pennsylvania
No Drawing. Filed May 20, 1957, Ser. No. 660,075
2 Claims. (Cl. 136—5)

This invention is a substitution type titanium dioxide semi-conductor which has its resistivity lowered by quenching. Such bodies are useful for thermo-electric generators and also as rectifiers. The substituted ions are pentavalent ions from group V of the periodic table (i.e., Nb, Sb, Ta) in relatively small amounts (e.g., 3 mol. percent). A typical formula for the bodies is:

$$Ti_{1-x}^{4+}Nb_x^{5+}(e)_x^{-}O_2^{2-}$$

The bodies are ceramics prepared by the usual ceramic techniques of mixing, forming to shape and firing. For thermo-electric purposes, an extruded rod is a convenient shape because the hot junction can be located at one end and the cold junction at the other end.

The resistivity and the thermo-electric force are structure sensitive properties dependent upon the previous thermal history. By heating the ceramics to a high temperature (e.g., 1200°–1500° C.) and quenching in air or other coolant, the high temperature structure is frozen into the ceramics with the result that the resistivity is lowered by two or more decades (i.e., decreased by $10^2$, $10^3$, $10^4$ ohms/cm.³) and the thermo-electric force is decreased. However, the change in thermo-electric force is relatively slight compared to the decrease in resistance so that the power output obtained is much greater for the quenched ceramics.

At low percentages of the substituted ions, the resistance is high (e.g., $10^7$ to $10^{10}$ ohms/cm.³) but as the percentage approaches ½% the resistance of the quenched ceramic drops to $10^3$ or $10^4$ ohms/cm.³. Additions above 1% do not drop the resistance. Throughout the range ¼ to 5 mol. percent, the quenched ceramic has resistance of less than half the non-quenched ceramic which means the power output can be much greater. For power applications, the range of ¼% to 5% is useful with the maximum power (.26 watt at .34 volt for a couple 1″ in diameter and 1″ in length) being developed from a body having the composition 97 mol. percent TiO₂ and 3% Nb₂O₅ with a hot junction temperature of 922° C. and a cold junction temperature of 180° C.

The following are specific examples:

I:                                          Mol percent
  TiO₂ _____ 95–99.75
  Nb₂O₅ _____ 5–.25
II:
  TiO₂ _____ 95–99.75
  Sb₂O₅ _____ 5–.25
III:
  TiO₂ _____ 95–99.75
  Ta₂O₅ _____ 5–.25

The pentavalent ions are given as part of the oxides but it will be understood that any other form may be used. Salts break down and free metal oxidizes at the firing temperature of the ceramic.

The greatest power output is obtained from the quenched bodies containing TiO₂ and Nb₂O₅. A greater voltage but higher resistance is obtained with quenched bodies of TiO₂ and Ta₂O₅ or Sb₂O₅. Quenched bodies containing TiO₂ and V₂O₅, As₂O₅ or Bi₂O₃ (other members of periodic group V) do not have better properties than non-quenched bodies and have resistance in the range of $10^6$ to $10^{11}$ ohms/cm.³ with either little or no improvement or slightly higher resistance from quenching.

Other cations with valences of from plus 1 to plus 6 have been added without improving the characteristics. Nor was any improvement obtained by multiple additions of pentavalent ions such as Nb, Sb, Ta, V, to obtain complex bodies of three or more components.

The highest thermo-electric power and voltage were obtained from bodies of TiO₂ and Nb₂O₅ when coupled with a metal of high positive E.M.F. (such as Chromel) with the cold junction temperature raised to 180°–200° C. The temperature co-efficient of resistivity is negative with the resistance dropping rapidly until the cold junction temperature reaches 150° and levelling off at about 200° C. The thermo-electric voltage drops slowly to cold junction temperatures up to 400° C. with a result that maximum power output is obtained at about 200° C. The bodies are not subject to oxidation up to at least hot junction temperatures of 900° C. which permits high temperature operation.

The TiO₂, Nb₂O₅ bodies exhibit rectification properties up to temperatures of 400° C. For example at 200° C., a body of 99% TiO₂ and 1% Nb₂O₅ has a forward resistance of $1.6 \times 10^3$ and a back resistance of $1.9 \times 10^4$ ohms/cm.³. A body of 98.5% TiO₂ and 1½% Nb₂O₅ at 300° C. has a forward resistance of $1.3 \times 10^3$ and a back resistance of $1.9 \times 10^4$ ohms/cm.³.

What is claimed as new is:

1. A high temperature fired semi-conductor ceramic body consisting essentially of a host lattice of TiO₂ into which is introduced a percentage of pentavalent ions selected from the group consisting of Nb, Ta, Sb in a mol percentage range from .25 to 5% of the TiO₂, said body being fired at about 1200°–1500° C. and quenched from a temperature in the region of its firing temperature and characterized by a reduction in resistance of several decades in magnitude as compared to unquenched bodies of the same composition and being further characterized by a thermo-electric force which is relatively slightly decreased as compared to said decrease in resistance so that the thermoelectric power output obtained is much greater for the quenched bodies.

2. A thermocouple comprising a thermoelectric element composed of a high temperature fired semi-conductor body consisting essentially of a host lattice of TiO₂ into which is introduced a percentage of pentavalent ions selected from the group consisting of Nb, Ta, Sb in a mol percentage range from .25 to 5% of the TiO₂, said body being fired at about 1200°–1500° C. and quenched from a temperature in the region of its firing temperature and characterized by a thermoelectric force which is relatively slightly decreased as compared to said decrease in resistance so that the thermo-electric power output obtained is much greater for the quenched bodies.

References Cited in the file of this patent

UNITED STATES PATENTS

| 2,272,330 | Schupp | Feb. 10, 1942 |
| 2,311,918 | Wainer et al. | Feb. 23, 1943 |
| 2,331,444 | Wainer | Oct. 12, 1943 |
| 2,511,216 | Miller | June 13, 1950 |
| 2,530,255 | Malek | Nov. 14, 1950 |
| 2,563,307 | Burnham et al. | Aug. 7, 1951 |
| 2,588,508 | Findley | Mar. 11, 1952 |
| 2,675,417 | Heibel | Apr. 13, 1954 |
| 2,692,212 | Jenkins et al. | Oct. 19, 1954 |
| 2,748,250 | Anrus | May 29, 1956 |
| 2,886,682 | Martin | May 12, 1959 |

FOREIGN PATENTS

| 165,585 | Australia | Oct. 12, 1955 |

OTHER REFERENCES

Johnson et al.: J. Amer. Ceramic Soc., vol. 32, No. 12, December 1949 (pages 398–401).